United States Patent [19]

Watson, Jr. et al.

[11] Patent Number: 4,587,301

[45] Date of Patent: May 6, 1986

[54] METHOD OF USING MIXED ALIPHATIC/AROMATIC POLYCARBODIIMIDES

[75] Inventors: Stuart L. Watson, Jr., South Charleston; Gordon R. Humphreys, Clendenin, both of W. Va.

[73] Assignee: Union Carbide Corporation, Danbury, Conn.

[21] Appl. No.: 676,084

[22] Filed: Nov. 29, 1984

Related U.S. Application Data

[62] Division of Ser. No. 469,434, Feb. 24, 1983, Pat. No. 4,487,964.

[51] Int. Cl.⁴ .................. C08F 8/30; C08L 75/00
[52] U.S. Cl. ....................... 525/123; 525/907
[58] Field of Search ................. 525/907, 123

[56] References Cited

U.S. PATENT DOCUMENTS 3,639,353  2/1972  Brown .................... 525/907
4,169,866  10/1979  Bonin et al. ............. 525/907

Primary Examiner—John C. Bleutge
Assistant Examiner—A. L. Carrillo
Attorney, Agent, or Firm—Jean B. Mauro

[57] ABSTRACT

Mixed aliphatic/aromatic polycarbodiimides can be prepared by first heating aliphatic mono- and diisocyanates with a phospholene oxide catalyst and then feeding the aromatic mono and/or diisocyanates in an inert solvent to the reaction mixture. These polycarbodiimides find use in a method for cross-linking carboxylated latexes.

10 Claims, No Drawings

METHOD OF USING MIXED ALIPHATIC/AROMATIC POLYCARBODIIMIDES

This application is a division of prior U.S. application Ser. No. 469,434, filing date, Feb. 24, 1983, now U.S. Pat. No. 4,487,964.

BACKGROUND OF THE INVENTION

This invention pertains to mixed aliphatic/aromatic polycarbodiimides and more particularly to a method for their preparation.

The use of polycarbodiimides as the crosslinker for well-known carboxylated latexes has been demonstrated to provide a requisite combination of control as well as rapid reaction. In the search for polycarbodiimides useful as crosslinking agents, it was found that aliphatic polycarbodiimides were very useful. Unfortunately, the raw materials used to prepare the aliphatic materials are quite expensive. In an attempt to prepare lower cost polycarbodiimides, it was found that the aromatic isocyanates used to prepare aromatic polycarbodiimides were considerably less expensive. However, aromatic polycarbodiimides failed to yield acceptable rates and degree of crosslinking. Thus, it was felt that a co-polycarbodiimide containing the combination of both aliphatic and aromatic constituents formed by a proper mixture of aliphatic and aromatic isocyanates would yield the requisite crosslinking rate and acceptable cost parameters.

In the attempts to prepare the aliphatic/aromatic co-polycarbodiimide, it was found that these materials were much more difficult to prepare than either the fully aromatic or the fully aliphatic system. Using a procedure which satisfactorily yielded either of the all aliphatic or all aromatic polycarbodiimides, the mixed system often yielded gelled or extremely viscous materials having severe discoloration.

It is therefore an object of this invention to provide a method for preparing mixed aliphatic/aromatic polycarbodiimides in satisfactory yields.

Other objects will become apparent to those skilled in the art upon a further reading of the specification.

SUMMARY OF THE INVENTION

A facile and economic method of preparing mixed aliphatic and aromatic polycarbodiimides has been found which comprises the following steps seriatim:
(A) charging a mixture of cyclo-aliphatic or saturated aliphatic mono- and diisocyanates to a reactor with agitation under an inert atmosphere;
(B) heating the resultant mixture to about 120° to about 160° C.;
(C) adding a catalytic amount of a phospholene oxide catalyst to the reactor;
(D) feeding a mixture of a non-reactive solvent and aromatic mono- and/or diisocyanate to the reactor; and
(E) maintaining agitation at about 120° to about 160° C. until all of the isocyanate functionality is converted to carbodiimide functionality; with the provisos that
(a) said cycloaliphatic moieties contain 6 to about 10 carbons,
(b) said saturated aliphatic moieties contain from about 4 to about 12 carbons,
(c) said aromatic moieties contain from 6 to about 12 carbons,
(d) the molar ratio of all of the mono- to diisocyanates ranges from about 2:1 to about 2:10; and
(e) the molar ratio of cycloaliphatic and/or saturated aliphatic isocyanate groups to aromatic isocyanate groups ranges from about 0.5:1 to about 2:1. Pressure and time are not critical.

Although superatmospheric or sub-atmospheric pressures can be used, it is preferred to use atmospheric pressures for economic reasons.

While temperatures of about 120° C. to about 160° C. can be used, it is preferred to use a range of about 120° C. to about 140° C.

The term "catalytic amount" is used herein to mean about 0.1 to about 0.8% by weight based on the total weight of isocyanates charged.

Many variations of the catalyst can be used. Examples include the monoxidized phospholene as well as phospholene sulfide. Alternatives include derivatives derived by substituting on and for the phenyl groups attached to the phosphorus atom such as by an ethyl moiety. Additional substitutions on the cyclic phosphorus ring can be made by substituting hydrogen, alkenyl, aryl, aralkyl, alkoxy, chlorine or bromine groups.

Exemplary cycloaliphatic and saturated aliphatic mono and diisocyanates include:
butylisocyanate
isophorone diisocyanate
1,6-hexane diisocyanate
dicyclohexylmethane diisocyanate
1,4-tetramethylene diisocyanate
1,12-dodecane diisocyanate
cyclohexane diisocyanate Exemplary aromatic mono and diisocyanates include:
phenyl isocyanate
4,4'-diisocyanotodiphenylmethane
toluene diisocyanate
naphthalenediisocyanate Although the molar ratios of all of the mono- to diisocyanate groups can range from about 2:1 to about 2:10 it is preferred to use ratios of about 2:1 to about 4:1.

Although the molar ratio of cycloaliphatic and/or saturated aliphatic isocyanate groups to aromatic isocyanate groups can range from about 0.5:1 to about 2:1, it is preferred to use a range of about 0.75:1 to about 1.25:1.

The method of the instant invention is preferably carried out in a non-reactive organic solvent such as, glycol diesters or aliphatic esters each having about 8 to about 20 carbons, aromatic hydrocarbons having 6 to about 12 carbons, and the like. Exemplary solvents include diethylene glycolether diacetate, dipropylene glycol dibutyrate, hexylene glycol diacetate, amyl acetate, butyl acetate, propryl propionate, ethyl butyrate, toluene, o-, m- and p-xylene, benzene, diethyl benzene, and the like.

In the prior art preparation of polycarbodiimides, a catalyst is employed preferably with an inert organic solvent and combinations of mono- and diisocyanates as desired to control the product polycarbodiimide molecular weight and functionality. The combination of two isocyanate moieties yields a carbodiimide group with evolution of carbon dioxide:

$$R-NCO + OCN-R \xrightarrow{\text{CATALYST}} R-NCN-R + CO_2$$

It was found that during the preparation of mixed aliphatic and aromatic polycarbodiimides where the corresponding aliphatic and aromatic isocyanates are charged to the reactor together with solvent and catalyst that the rate of carbon dioxide evolution and carbodiimide functionality formation decreased significantly during the process. The time of the decrease corresponded to the amount of aromatic isocyanate present due to the preferential reaction of aromatic isocyanate at the expense of the aliphatic isocyanate. When the aliphatic isocyanate and solvent are charged first to the reactor followed by the catalyst, the reactor raised to the reaction temperature and the aromatic isocyanate fed to the reactor last, a superior aliphatic/aromatic polycarbodiimide product was obtained. The product was superior to that obtained by charging all of the isocyanates to the reactor at the same time in having less discoloration and a much lower viscosity. It was unexpectedly found that the reactivity of the product obtained by the practice of this invention exhibited a reactivity in crosslinking carboxylated latexes which approximated that of aliphatic carbodiimides which are known to be more reactive crosslinkers than aromatic polycarbodiimides. The low reactivity of the latter makes them unsuitable for crosslinking carboxylated latexes.

Many variations may be used in the practice of the instant invention. In addition to the temperature range mentioned above almost any solvent can be used so long as the boiling point is sufficiently high to allow carbodiimide formation to take place and there are no active hydrogen groups on the solvent which could react with either the isocyanates or the product carbodiimides. The solvent can be placed in either the reactor charge or in the feed tank as preferred or split between them.

GLOSSARY OF MATERIALS USED

LPCA 5011—20% Cellosolve acetate solution of a carboxylated resin described in U.S. Pat. No. 4,096,125 incorporated herein by reference.

NIAX Polyol PCP—0300—Trademark of Union Carbide Corporation for polycaprolactone triol.

NIAX Polyol PCP—0301—Trademark of Union Carbide Corporation for polycaprolactone triol.

Butyl Carbitol acetate—Trademark of Union Carbide Corporation for the butyl monoether of diethylene glycol monoacetate.

Ucar Latex 153—Trademark of Union Carbide Corporation for carboxylated emulsion polymer.

Ucar Latex 4580—Trademark of Union Carbide Corporation for carboxylated emulsion polymer.

Ucar Latex 175—Trademark of Union Carbide Corporation for carboxylated emulsion polymer.

Colloid 677—Trademark of Colloid Inc. for defoamer.

Mineralite 3X—Trademark of Mineral Co. for mica.

TiPure R901—Trademark of Dupont Co. for titanium dioxide.

TiPure R960—Trademark of Dupont Co. for titanium dioxide.

ASP—400—Trademark of Minerals and Chemicals for clay.

Chlorowax 40—Trademark of Diamond Shamrock for chlorinated wax.

PMA—30—Trademark of Troy Chemical Co. for mildewcide.

Celite 281—Trademark of Johns-Manville for diatomaceous silica.

Aerosol A—196—Trademark of American Cyanamid Co. for the sodium salt of dialkyl sulfosuccinate.

Daniels Disperse—Ayd W-22—Trademark of Daniel Products Co, for dispersant.

Igepal Ca—630 surfactant—Trademark of GAF Corp. for ethoxylated alkyl phenol.

Foamaster V.F.—Trademark of NOPCO Chemical for defoamer.

Nopocide N-96—Trademark of Diamond Shamrock for tetrachloroisophthalonitrile.

Snowflake—Trademark of Allied Chemical Co. for calcium carbonate.

Surfynol 104 surfactant—Trademark of Air Products and Chemicals Inc. for an acetylenic glycol.

Chrome Chem 895—Trademark of Tenneco for pre-dispersed carbon black.

Cellosolve solvent—Trademark of Union Carbide Corporation for a monoalkyl ether of ethylene glycol.

Hexyl Cellosolve—Trademark of Union Carbide Corporation for a monohexyl ether of ethylene glycol.

Polyol WSRN (4% active)—Trademark of Union Carbide Corporation for mixed alkylene oxide water soluble polyethers.

CYMEL 303—Trademark of American Cyanamid Co. for hexamethoxymethylmelamine.

Tergital NP—10 Surfactant—Trademark of Union Carbide Corporation for alkylated ethoxylated phenols.

Tamol 731—Trademark of Rohn and Haas for dispersant.

Butyl Carbitol—Trademark of Union Carbide Corporation for the butyl monoether of diethylene glycol.

XAMA-7 is a polyfunctional aziridene crosslinker available from Cordova Co.

TESTS AND TERMS

The following tests and terms were used in demonstrating the efficacy of this invention.

Double Rub Test—A piece of cheesecloth is saturated with methyl ethyl ketone, then rubbed on the substrate until penetration occurs. One back and forth rub is a double rub.

Reactivity Test—Time for gelation at 50° C. as described in Example 10.

Theoretical functionality—An idealized value based on the theoretical structure assuming pure materials with no side reactions.

Tensile Strength—ASTM D 638-60T.

% Elongation—ASTM D 638-60T.

% Length Increase—Sample measured with a ruler.

% Weight Gain—Sample measured on a balance.

Formulation Stability—visual inspection.

Peel Strength (Cf Example 12).

Sheer Failure (Cf Example 12).

EXAMPLES

The invention is further described in the Examples which follow. All parts and percentages are by weight unless otherwise specified.

The following examples demonstrate the value and versatility of the invention. The following guide may be useful in analyzing the examples:

(1) Examples 1 and 2 demonstrate the difficulties of preparing the desired compounds by the batch process.

(2) Examples 3 and 4 demonstrate the ability to make the desired composition by the process of this invention.

(3) Examples 5, 6, and 7 show that the process can be used to prepare other aliphatic/aromatic polycarbodiimides.

(4) Examples 8, 9 and 10 show the unexpected high reactivity of the aliphatic/aromatic polycarbodiimide preparable by the process of this invention.

(5) Examples 11–14 demonstrate the utility of the prepared aliphatic/aromatic polycarbodiimides.

EXAMPLE 1

Preparation of Aliphatic/Aromatic Polycarbodiimide by Batch Process

Into a 1 liter 3 neck round bottom flask equipped with a heating mantle, thermometer, mechanical stirrer, and nitrogen sparge were placed 77.3 g butyl isocyanate, 135.9 g toluene diisocyanate (2,4 and 2,6 mixed isomers), 86.7 g isophorone diisocyanate, 282 g of hexylene glycol diacetate, and 18 g of a 10% solution of 3-methyl-1-phenyl-2-phospholene-1-oxide in xylene. The mixture was heated with stirring and nitrogen sparge at 145° C. After four hours reaction and before complete conversion of the isocyanate groups to carbodiimide groups as observed with infrared spectrophotometry, the reaction mixture gelled to a solid mass.

EXAMPLE 2

Preparation of Aliphatic/Aromatic Polycarbodiimide by Batch Process

To the apparatus of Example 1 were charged 83.4 phenyl isocyanate, 155.6 g isophorone diisocyanate, 61.0 g toluene diisocyanate, 288 g hexylene glycol diacetate, and 12 g of 10% 3-methyl-1-phenyl-2-phospholene-1-oxide in xylene. The materials were heated with stirring and nitrogen sparge to 145° C. After 10 hours reaction the material appeared close to completion of reaction but was extremely viscous and dark colored. Shortly thereafter the material solidified to a solid gel.

EXAMPLE 3

Preparation of Aliphatic/Aromatic Polycarbodiimide by a Feed Process

The apparatus of Example 1 was employed with the addition of a feed tank and pump. To the feed tank were charged 61.0 g toluene diisocyanate, 83.4 g phenyl isocyanate, and 285 g amyl acetate. To the reactor were charged 155.6 g isophorone diisocyanate and 15 g of a 10% solution of 3-methyl-1-phenyl-2-phospholene-1-oxide in xylene. The reactor was heated to 140° C. with stirring and nitrogen sparge, and the material in the feed tank was added over a 5.5 hour period. After two additional hours of reaction the material was completed and cooled. The product had a viscosity of 0.5 Stoke (Gardner Bubble Viscometer) and a color of 5+ using a Gardner Hellige Comparator. Titration of the carbodiimide functionality gave a value of 9.75% by the procedure of Zaremko and Watts (*Microchem. J. Symp. Ser.*, 2, 591(1962)).

EXAMPLE 4

Preparation of Aliphatic/Aromatic Polycarbodiimide by a Feed Process (Modified Conditions)

The previous Example 3 was repeated with the exceptions being that a 5.25 hour feed time and a reaction temperature of 120° C. was employed. The material required 21 hours to react to completion. Using the tests of Example 3, the product had a viscosity of 0.5 Stoke, a color rating of 5+, and a percent carbodiimide of 8.80.

EXAMPLE 5

Preparation of Alternate Composition by the Feed Process

Using the apparatus of Example 3, to the feed tank were charged 76.3 g phenyl isocyanate, 55.8 g. toluene diisocyanate, and 280 g. of hexylene glycol diacetate. The the reactor were charged 167.9 g of bis-(4-isocyanatocyclohexyl)-methane and 20 g of a 10% solution of 3-methyl-1-phenyl-2-phospholene-1-oxide in xylene. A feed time of 3 hours was employed with a reaction temperature of 140° C. The reaction was completed after 26 hours. Analysis of the product as described in Example 3 gave a viscosity of 3.20 Stoke, a color rating of 12, and a percent carbodiimide of 8.78.

EXAMPLE 6

Preparation of Alternate Composition by the Feed Process

Using the apparatus of Example 3, to the feed tank were charged 140.3 g toluene diisocyanate and 280 g amyl acetate. To the reactor were charged 159.7 g butyl isocyanate and 20 g of 10% 3-methyl-1-phenyl-2-phospholene-1-oxide in xylene. A feed time of 3 hours was employed along with a reaction temperature of 140° C. The reaction required a total time of 5 hours for completion. Evaluation by the procedures in Example 3 gave a viscosity of less than 0.5 Stoke and a color rating of 7.

EXAMPLE 7

Preparation of Alternate Composition by the Feed Process

Using the apparatus of Example 3, to the feed tank were charged 155.2 g phenyl isocyanate and 280 g amyl acetate and to the reactor were charged 144.8 g isophorone diisocyanate and 20 g of 10% 3-methyl-1-phenyl-2-phospholene-1-oxide in xylene. A reaction temperature of 140° C. and a feed time of 3 hours were employed. The reaction required 22 hours for completion. Evaluation by the procedures in Example 3 gave a viscosity of less than 0.5 Stoke and a color rating of 5.

EXAMPLE 8

Preparation of Aliphatic Polycarbodiimide for Reactivity Test

In the apparatus of Example 1 were charged 68.7 g butyl isocyanate, 231.2 g isophorone diisocyanate, 270 g amyl acetate, and 30 g of 10% 3-methyl-1-phenyl-2-phospholene-1-oxide in xylene. The mixture was heated with stirring at 140° C. under a nitrogen sparge for 10 hours. Evaluation by the procedures in Example 3 gave a viscosity of less than 0.5 Stoke, a color rating of 3, and a percent carbodiimide of 9.79.

EXAMPLE 9

Preparation of Aliphatic Polycarbodiimide for Reactivity Test

Into the apparatus of Example 1 were charged 93.9 g phenyl isocyanate, 206.1 g toluene diisocyanate, 270 g amyl acetate, and 30 g of a 10% 3-methyl-1-phenyl-2-phospholene-1-oxide. The mixture was heated with stirring under a nitrogen sparge to 140° C. After 1 hour reaction time, the reaction was complete. Evaluation by the procedures of Example 3 gave a viscosity of less than 0.5 Stoke, a color rating of 7, and a percent carbodiimide of 11.36.

EXAMPLE 10

Comparison of Polycarbodiimide Structures in Reactivity for Crosslinking

A material termed LPCA 5011 described in U.S. Pat. No. 4,096,125 (20% CELLOSOLVE Acetate, 50% phthallic anhydride, 15% NIAX polyol PCP-0300, 15% NIAX Polyol PCP-0301 to an approximate acid equivalent weight of 363) was used to prepare the following master batch:

| | |
|---|---|
| LPCA 5011 | 363 g (one acid equivalent) |
| Triethylamine | 101 g (one acid equivalent) |
| CELLOSOLVE Acetate | 536 g |
| | 1000 g |

This master batch was blended with the polycarbodiimide solution of Example 8:
Master Batch: 36.0 g (0.036 acid equivalents)
Polycarbodiimide: 14.0 g (0.036 carbodiimide equivalents)
This well-stirred mix was placed in an oven at 50° C. and found to gel in 2.3 hr.

The master batch was additionally blended with the aromatic polycarbodiimide solution of Example 9.
Master Batch: 37.4 g (0.0347 acid equivalents)
Polycarbodiimide: 12.6 g (0.0374 carbodiimide equivalents)
After three days in a 50° C. oven the mix was unchanged (no gelation).

Finally the master batch was blended with the aliphatic/aromatic polycarbodiimide solution of Example 4:
Master Batch: 36.1 g (0.0361 acid equivalents)
Polycarbodiimide: 13.9 g (0.0361 carbodiimide equivalents)
This mixture was placed in a 50° C. oven and found to gel in 2 hours showing the surprising reactivity of the lower cost aliphatic/aromatic polycarbodiimide.

EXAMPLE 11

Evaluation of the Aliphatic/Aromatic Polycarbodiimide in a Coil Coating Formulation The polycarbodiimide solution of Example 3 was emulsified in water using the following materials and ratios:
Polycarbodiimide Solution: 45 parts
AEROSOL A-196 (American Cyanamid): 1 part
Triethylamine: 0.68 part
Water: 55.33 part
A base coating formulation was prepared as listed below:

| Pigment Grind | |
|---|---|
| Water | 185.6 |
| Ammonia (28%) | 0.4 |
| Ethylene glycol | 13.2 |
| TERGITOL NP-10 | 8.8 |
| TAMOL 731 | 28.8 |
| FOAMASTER VF | 2.4 |
| TI-PURE R-960 | 847.6 |
| | 1086.8 |
| Let Down | |
| Pigment Grind | 1086.8 |
| FOAMASTER VF | 9.2 |

| -continued | |
|---|---|
| Water | 141.6 |
| Ammonia 28% | 22.4 |
| UCAR 4511 | 2173.6 |
| Butyl CARBITOL | 159.2 |
| | 3592.8 |
| Ammonia to pH 9 | |

From this base coating the following formulations were prepared:

| System | Crosslinker | Base Formulation, g | Polycarbodiimide Emulsion, g | CYMEL 303, g |
|---|---|---|---|---|
| A | None | 106 | — | — |
| B | Polycarbodiimide Emulsion | 106 | 13.2 | — |
| C | CYMEL 303 | 106 | — | 2.5 |

CYMEL 303: Hexamethoxymethylmelamine

The formulations were coated on Bonderite #37 panels and cured at two different peak metal temperatures and evaluated by rubbing with cheesecloth soaked with methyl ethyl ketone (MEK). The results are shown below:

| | MEK DOUBLE RUBS | |
|---|---|---|
| Systems | 250° F. | 400° F. |
| A | 5 | 7 |
| B | 24 | 50+ |
| C | 10 | 50+ |

These results showed that the polycarbodiimide cured at a lower temperature than the melamine system and gave strong performance at the standard high cure temperature.

EXAMPLE 12

Evaluation of the Aliphatic/Aromatic Polycarbodiimide in a Roof Coating Application A master batch of roof coating formulation was prepared as detailed below:

| | |
|---|---|
| UCAR 153 | 686 |
| KTPP | 3 |
| COLLOID 677 | 3 |
| CALIDRIA HPO | 12 |
| MINERALITE 3X | 140 |
| TIPURE R-901 | 10 |
| ASP-400 | 50 |
| CHLOROWAX 40 | 22 |
| Antimony Oxide | 2 |
| Tricresyl Phosphate | 63 |
| DMA-30 | 2 |
| CELITE 281 | 70 |
| Triethylamine | 10.5 |
| Water | 200 |
| | 1273.5 |

This material was used along with the polycarbodiimide emulsion of Example 11 to prepare the following formulations:

| System | Master Batch, g | Water, g | Polycarbodiimide Emulsion, g | XAMA-7, g |
|---|---|---|---|---|
| A | 200 | 9.6 | — | — |
| B | 200 | — | 9.6 | — |

-continued

| System | Master Batch, g | Water, g | Polycarbodiimide Emulsion, g | XAMA-7, g |
|---|---|---|---|---|
| C | 200 | 7.9 | — | 1.7 |

XAMA-7: Multifunctional aziridine crosslinker from Cordova Chemical.

The final formulations were air-dried for two weeks at ambient temperature. The resultant films were evaluated for water swelling by ambient temperature soaking for two days and for tensile properties.

| System | Water Swelling % Weight Gain |
|---|---|
| A | 149 |
| B | 25 |
| C | 41 |

| Dry Film | |
|---|---|
| Tensile Strength | % Elongation |
| 70 | 600 |
| 114 | 76 |
| 125 | 113 |

These results showed that the polycarbodiimide cured at ambient temperature and gave improved properties to the roof coating.

EXAMPLE 13

Evaluation of the Aliphatic/Aromatic Polycarbodiimide in a Hardboard Coating

A base hardboard primer formulation was prepared as shown below:

| Pigment Grind | |
|---|---|
| Water | 256.2 |
| Daniels DISPERSE-AID W-22 | 20.4 |
| IGEPAL CA-630 | 6.9 |
| FOAMASTER VF | 5.7 |
| NOPOCIDE N-96 | 17.1 |
| SNOWFLAKE | 1109.7 |
| SURFYNOL 104 | 8.4 |
| TI-PURE R-960 | 369.6 |
| CHROME CHEM 895 | 0.9 |
| Water | 28.5 |
| | 1823.4 |
| Let Down | |
| Pigment Grid | 1800.0 |
| UCAR 4580 | 1248.0 |
| FOAMASTER VF | 3.0 |
| CELLOSOLVE | 127.0 |
| Hexyl CELLOSOLVE | 84.0 |
| Dibutyl phthallate | 60.0 |
| Water | 180.0 |
| POLYOL WSRN | 40.6 |
| Ammonia (14%) | 59.0 |
| Water | 100.4 |
| | 3702.0 |
| Ammonia to pH 9 | |

This material, along with the polycarbodiimide emulsion of Example 11 was employed to prepare the following formulations:

| System | Base Formulation, g | Polycarbodiimide Emulsion, g | CYMEL 303, g | Water, g |
|---|---|---|---|---|
| A | 159 | — | — | 18.9 |
| B | 159 | 18.9 | — | — |
| C | 159 | — | 3.6 | 15.3 |

These formulations were coated on hardboard and air-dried at ambient temperature. The cure state of the coatings was evaluated by rubbing with cheesecloth soaked in methyl ethyl ketone (MEK)

| | MEK DOUBLE RUBS | |
|---|---|---|
| Systems | 1 day | 3 days |
| A | 4 | 22 |
| B | 30 | 50 |
| C | 13 | 50 |

Continued evaluation at further time periods failed to show any substantive change. These results showed the rapid low temperature crosslinking of the polycarbodiimide.

EXAMPLE 14

Evaluation of the Aliphatic/Aromatic Polycarbodiimide in Pressure Sensitive Adhesives The polycarbodiimide emulsion of Example 11 was employed to crosslink a water-borne pressure sensitive adhesive, UCAR 175. Initially, the following formulations were prepared with the UCAR 175 being adjusted to pH 9 with triethylamine:

| System | UCAR 175, g | Polycarbodiimide Emulsion, g | XAMA-7, g | Water, g |
|---|---|---|---|---|
| A | 117 | — | — | 10.6 |
| B | 117 | 10.6 | — | — |
| C | 117 | — | 1.9 | 8.7 |

The materials were applied to MYLAR tape and cured at 100° C. for 30 min. The resultant adhesive tapes were placed on steel substrates and evaluated for their adhesive strength by measuring the force required to peel the tape (pli=pounds per linear inch) and the time which the tape would hold a 500 g weight in a vertical position. The results are shown below:

| System | Shear, hours | Peel, pli |
|---|---|---|
| A | 0.1 | 4.80 |
| B | 48 | 0.15 |
| C | 2.9 | 0.26 |

These results showed that the polycarbodiimide crosslinked the adhesive latex reducing its tackiness (peel) while greatly increasing the adhesive strength (shear).

Although the invention has been described in its preferred forms with a certain degree of particularity, it is understood that the present disclosure of the preferred form has been made only by way of example and that numerous changes may be made without departing from the spirit and the scope of the invention.

We claim:
1. A method of preparing a cross-linkable composition comprising admixing:
   (a) a carboxylated latex,
   (b) a cross-linking catalyst, and

(c) a mixed aliphatic and aromatic polycarbodiimide prepared by a process comprising the following steps seriatim:
(A) charging a mixture of cycloaliphatic or saturated aliphatic mono- and diisocyanates to a reactor with agitation under an inert atmosphere;
(B) heating the resultant mixture to about 120° to about 160° C.;
(C) adding a catalytic amount of a phospholene oxide catalyst to the reactor;
(D) feeding a mixture of a non-reactive solvent and aromatic mono- and/or diisocyanate to the reactor; and
(E) maintaining agitation at about 120° to about 160° C. until all of the isocyanate functionality is converted to carbodiimide functionality, with the provisos that:
(a) said cycloaliphatic moieties contain 6 to about 10 carbons;
(b) said saturated aliphatic moieties contain from about 4 to about 12 carbons;
(c) said aromatic moieties contain from 6 to about 16 carbons;
(d) the molar ratio of all of the mono-to-diisocyanates ranges from about 2:1 to about 2:10; and
(e) the molar ratio of cycloaliphatic and/or saturated aliphatic isocyanate groups to aromatic isocyanate groups ranges from about 0.5:1 to about 2:1.

2. A method of claim 1 wherein the molar ratio of cycloaliphatic and/or saturated aliphatic mono- and diisocyanates to aromatic mono- and diisocyanates ranges from about 0.75:1 to about 1.25:1.

3. A method of claim 2 wherein the aliphatic monoisocyanate is butyl isocyanate and the cycloaliphatic diisocyanate is isophorone diisocyanate.

4. A method of claim 2 wherein the aromatic diisocyanate is toluene diisocyanate.

5. A method of claim 1 using phenyl isocyanate, isophorone diisocyanate and toluene diisocyanate.

6. A method of claim 1 carried out in a non-reactive organic solvent.

7. A method of claim 6 wherein the solvent is a glycol diester.

8. A method of claim 6 wherein the solvent is an aliphatic ester.

9. A method of claim 1 wherein the phospholene oxide catalyst is 3-methyl-1-phenyl-2-phospholene-1-oxide.

10. A method of claim 1 wherein the cross-linking catalyst is an amine.

* * * * *